US007570395B2

(12) United States Patent
Kurumisawa

(10) Patent No.: US 7,570,395 B2
(45) Date of Patent: Aug. 4, 2009

(54) IMAGE DISPLAY DEVICE, METHOD OF DRIVING IMAGE DISPLAY DEVICE, AND ELECTRONIC APPARATUS

(75) Inventor: Takashi Kurumisawa, Shiojiri (JP)

(73) Assignee: Epson Imaging Devices Corporation, Tokyo (JP)

( * ) Notice: Subject to any disclaimer, the term of this patent is extended or adjusted under 35 U.S.C. 154(b) by 618 days.

(21) Appl. No.: 11/294,600

(22) Filed: Dec. 6, 2005

(65) Prior Publication Data

US 2006/0164698 A1 Jul. 27, 2006

(30) Foreign Application Priority Data

Jan. 21, 2005 (JP) ............................ 2005-013665

(51) Int. Cl.
*H04N 1/40* (2006.01)

(52) U.S. Cl. .................... 358/3.23; 358/3.24; 345/603; 345/604

(58) Field of Classification Search ................. 358/1.9, 358/3.23, 3.24, 1.2, 3.01, 3.26; 345/603, 345/604

See application file for complete search history.

(56) References Cited

U.S. PATENT DOCUMENTS 6,262,744 B1 * 7/2001 Carrein ....................... 345/604
2004/0165081 A1 * 8/2004 Shibaki et al. ........... 348/222.1
2005/0169551 A1 * 8/2005 Messing et al. ............. 382/260

FOREIGN PATENT DOCUMENTS

JP 09-238262 9/1997

* cited by examiner

*Primary Examiner*—James A Thompson
(74) *Attorney, Agent, or Firm*—Lowe Hauptman Ham & Berner, LLP

(57) ABSTRACT

An image display device in which one dot is displayed using M (M is an integer larger than 3) sub-pixels having different colors and being disposed adjacent to each other in a vertical direction or horizontal direction, a ratio of a length of the sub-pixel of the one dot in a disposition direction to a length, in a direction orthogonal to the disposition direction being M:3, includes a resolution converter that converts the resolution in the disposition direction of the image data which defines an image to be displayed for every dot to 3/M; a color separating unit that separates the image data converted by the resolution converter into color components corresponding to the M sub-pixels for every dot; and a driving circuit that drives the sub-pixels so as to have a resolution defined by the image data separated by the color separating unit.

15 Claims, 6 Drawing Sheets

$$Y = 0.299 \cdot R + 0.587 \cdot G + 0.114 \cdot B$$
$$U = 0.500 \cdot R - 0.419 \cdot G - 0.081 \cdot B$$
$$V = -0.169 \cdot R - 0.331 \cdot G + 0.500 \cdot B$$

(ITU-R BT601)

| 4 DOT PATTERN | | 3 DOT PATTERN |
|---|---|---|
| 1110 | → | 110 |
| 1101 | → | 101 |
| 1011 | → | 101 |
| 0111 | → | 011 |
| 0001 | → | 001 |
| 0010 | → | 010 |
| 0100 | → | 010 |
| 1000 | → | 100 |
| 0011 | → | 001 |
| 0110 | → | 010 |
| 1100 | → | 100 |
| 1001 | → | 101 |
| 1010 | → | 101 |
| 0101 | → | 101 |
| 0000 | → | 000 |
| 1111 | → | 111 |

IMAGE DISPLAY DEVICE, METHOD OF DRIVING IMAGE DISPLAY DEVICE, AND ELECTRONIC APPARATUS

RELATED APPLICATIONS

The present application is based on, and claims priority from, Japanese Application Number 2005-013665, filed Jan. 21, 2005, the disclosure of which is hereby incorporated by reference herein in its entirety.

BACKGROUND

1. Technical Field

The present invention relates to an image processing technique used when one dot image is displayed using four sub-pixels.

2. Related Art

In color display devices or output devices, for example, three colors of RGB sub-pixels correspond to one dot of an image to be displayed, and gray-scale levels (brightness) of the individual sub-pixels are controlled to display the color of the one dot. However, in this construction, since the range of displayable colors is limited, a technique for displaying one dot using four color sub-pixels has recently been proposed (for example, see JP-A-9-238262).

However, in image outputting devices such as a printer, drawing points can be freely controlled, but in image display devices such as a liquid crystal device, the positions of sub-pixels are fixed. Further, since in the liquid crystal device, or the like, generally, display is performed using RGB sub-pixels, in the case of displaying a color image in four sub-pixels, it is needed to change one square dot formed by three sub-pixels into one square dot formed by four sub-pixels.

Therefore, since an image display device which displays one dot by using four sub-pixels has disadvantages such as enlargement of displayable color range, a design change, or increased cost due to the design change such an image display device has not become widespread.

SUMMARY

An advantage of some aspects of the invention is that it provides an image display device that displays one dot by using four sub-pixels at low cost.

According to an aspect of the invention, an image display device in which one dot is displayed using M (M is an integer larger than 3) sub-pixels having different colors and being disposed adjacent to each other in a vertical direction or horizontal direction, a ratio of a length of the sub-pixel of the one dot in a disposition direction to a length in a direction orthogonal to the disposition direction being M:3, includes: a resolution converter that converts the resolution in the disposition direction of the image data which defines an image to be displayed for every dot to 3/M; a color separating unit that separates the image data converted by the resolution converter into color components corresponding to the M sub-pixels for every dot; and a driving circuit that drives the sub-pixels so as to have a resolution defined by the image data separated by the color separating unit. According to the aspect, it is possible to display one dot by M colors of sub-pixels by using sub-pixels arranged according to the related art and changing the color arrangement. In this case, the resolution is converted so that adjacent M dots are 3 dots.

In the above aspect, when converting the resolution, even though it is possible to prevent loss of color information, the edge or the boundary may be lost. Therefore, the resolution converter may determine whether the M dot image data is achromatic, and then may convert 3 dot image data with a predetermined rule on the basis of the determination. In particular, when it is determined that the M dots are of achromatic on the basis of the M dot image data, the resolution converter may compare luminance information of the M dot image data with a predetermined threshold value, and then may convert into 3 dot image data on the basis of the comparison. Further, the M may be 4.

According to another aspect of the invention, in addition to the image display device, a method of driving the image display device, and an electronic apparatus having an electro-optical device may be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
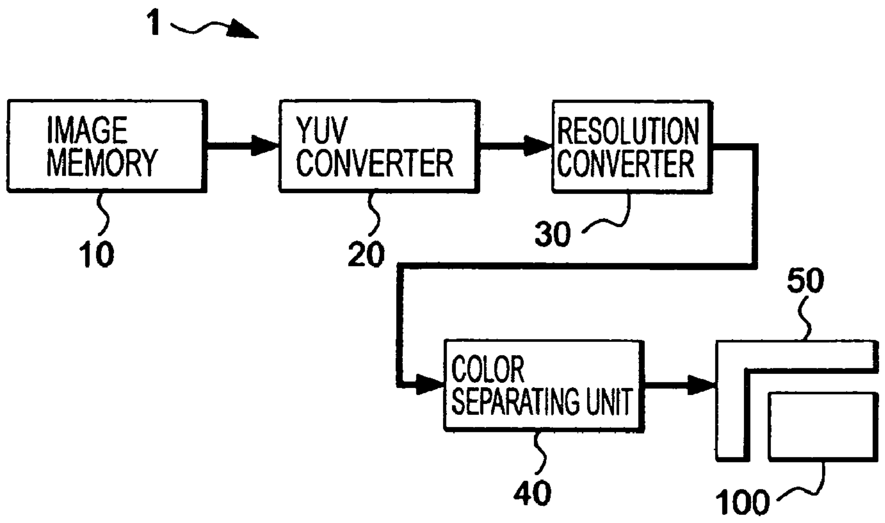
FIG. 1 is a block diagram showing a structure of an image display device according to an embodiment of the invention.

Exemplary embodiments of the invention will now be described with reference to accompanying drawings. FIG. 1 is a block diagram showing a structure of an image display device according to an embodiment of the invention.

In FIG. 1, the image display device 1 includes an image memory 10, a YUV converter 20, a resolution converter 30, a color separating unit 40, a driving circuit 50, and a display unit 100. Among these, the image memory 10 stores image data which defines a display image for every dot. In this embodiment, image data for one dot defines a resolution for every color component of R (red), G (green), and B (blue). Further, the image data is configured to be rewritten whenever the display image is changed by a higher-level device which is not shown, and to be read out in synchronization with vertical scanning and horizontal scanning.

A YUV converter 20 converts image data which defines gray-scale levels of individual colors of RGB into data representing Y (luminance), U (chrominance), and V (chrominance). Herein, values converted by the YUV converter 20 are applicable as values shown in FIG. 6.

In this embodiment, the resolution converter 30 reduces the resolution in a horizontal direction so there are 3 out of 4 dots. At the time of conversion, when the resolution converter 30 determines that the 4 dots before conversion are not of achromatic color, YUV data of 4 dots are multiplied by a predetermined coefficient such that the 4 dots are allocated into 3 dots, as described later, and then color information is stored. In contrast, when the resolution converter 30 determines that the 4 dots before conversion are of achromatic color, the 4 dots are compulsorily changed into a dot pattern representing a lineal drawing to be converted into 3 dots of YUV data while holding contour information, as described below.

A color separating unit 40 converts YUV data whose corresponding resolution has been converted into YUV data of 3 dots into image data which indicate resolutions for 4 colors of RGBC for every dot. As the converting method performed by the color separating unit 40, a method that uses a lookup table in which RGBC values have previously been stored that correspond to a gamut which will be taken as a YUV value is considered. However, since the lookup table is three dimensional, it is required to have a large capacity. Therefore, only RGBC values corresponding to representative YUV values are stored, and when a YUV value to be converted is distant from the representative value, an approximate RGBC value for the representative value may be obtained by interpolating in accordance with the separation distance.

The driving circuit 50 drives the display unit 100 in which sub-pixels are arranged, on the basis of distant RGBC image data.

Figure 2:
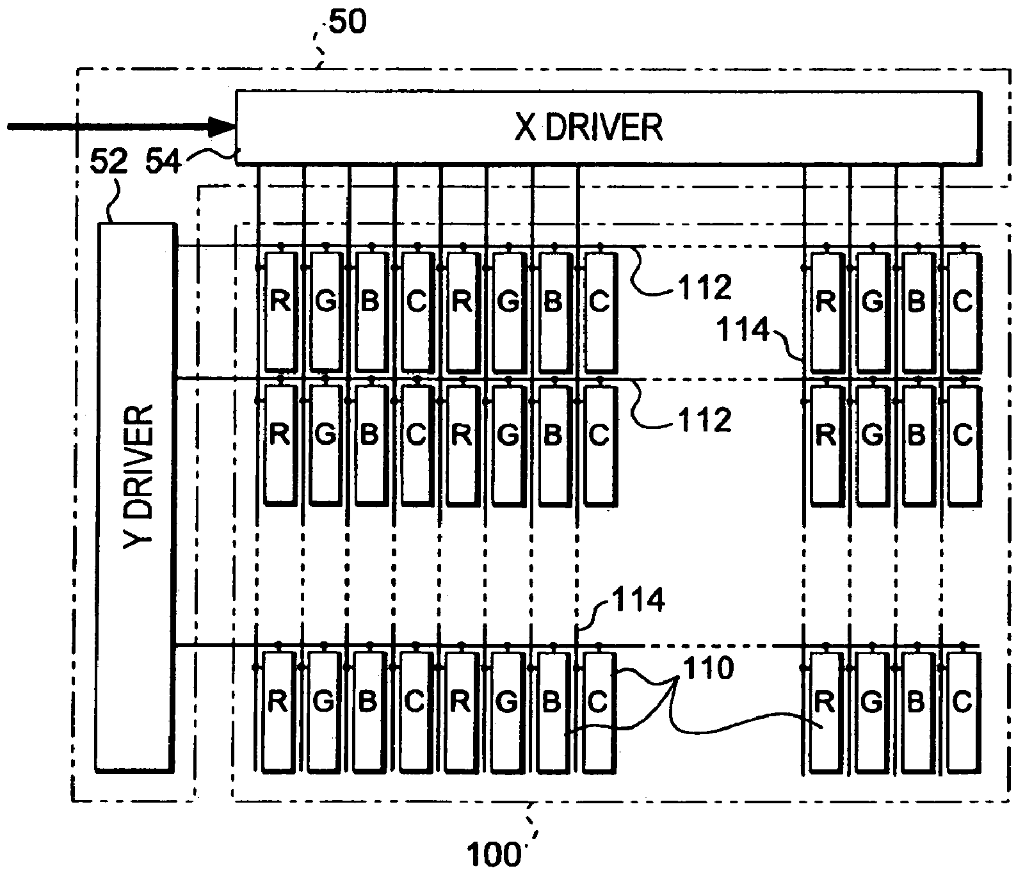
FIG. 2 is a view showing a structure of a display unit in the image display device.

Hereinafter, a structure of the display unit 100 will be described. FIG. 2 is a block diagram showing the structure of the display unit 100, and FIG. 3 is a view showing a shape of sub-pixels constituting one dot.

As shown in FIG. 2, in the display unit 100, sub-pixels 110 are arranged at intersections of a plurality of columns of scanning lines 112 and a plurality of rows of data lines 114. Here, the sub-pixels 110 are disposed so that R, G, B, and C sub-pixels 110 are repeated in this order in a horizontal direction, and are disposed in a stripe pattern vertically so that the sub-pixels 110 in each vertical column have the same color.

The driving circuit 50 mainly includes an X-driver 54 and a Y-driver 52. The Y driver 52 selects the scanning lines 112 one by one in a predetermined order, and the X driver 54 supplies voltage data in accordance with a gray-scale level of a corresponding sub-pixel to the sub-pixel 110 in the selected column.

Further, the Y driver 52 and the X driver 54 operate in synchronization with each other by means of a control circuit which is not shown. In detail, so as to output a data signal by means of the X driver 54 in accordance with the selection of the scanning line 112 by the Y driver 52, processes performed in each unit such as read by the image memory 10, data conversion by the YUV converter 20, resolution conversion by the resolution converter 30, and data conversion by the color separating unit 40 are controlled. Thereby, when a scanning line 112 is selected, the X driver 54 outputs a data signal of a voltage in accordance with the corresponding image data of RGBC image data indicating gray-scale levels of sub-pixels 110 positioned in the selected column.

Figure 3A:
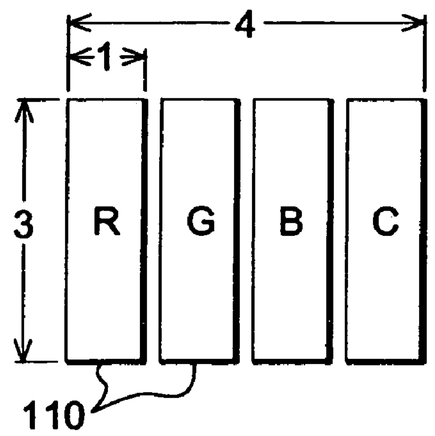
FIG. 3 is a view showing the shape of the pixel in the display unit.

In this embodiment, in one sub-pixel 110, the shape of the sub-pixel 110 is formed such that when, in the vertically long rectangular shape as shown in FIG. 3A, the length in the horizontal direction is '1', the length in the vertical direction is '3'. In this embodiment, one dot is formed of four RGBC sub-pixels 110 disposed adjacent to each other in the horizontal direction. Therefore, the ratio of vertical length to horizontal length of the one dot is 3:4, and the one dot is not square, but a horizontally long rectangular shape.

Further, image data stored in the image memory 10 defines a gray-scale level of RGB in each dot under the condition that the one dot is square. So, when an image is displayed on the display unit 100 on the basis of the image data in which RGB is simply converted into RGBC, the image becomes a vertically long image. Therefore, the resolution in the horizontal direction is reduced by ¾ as mentioned before.

Figure 4:
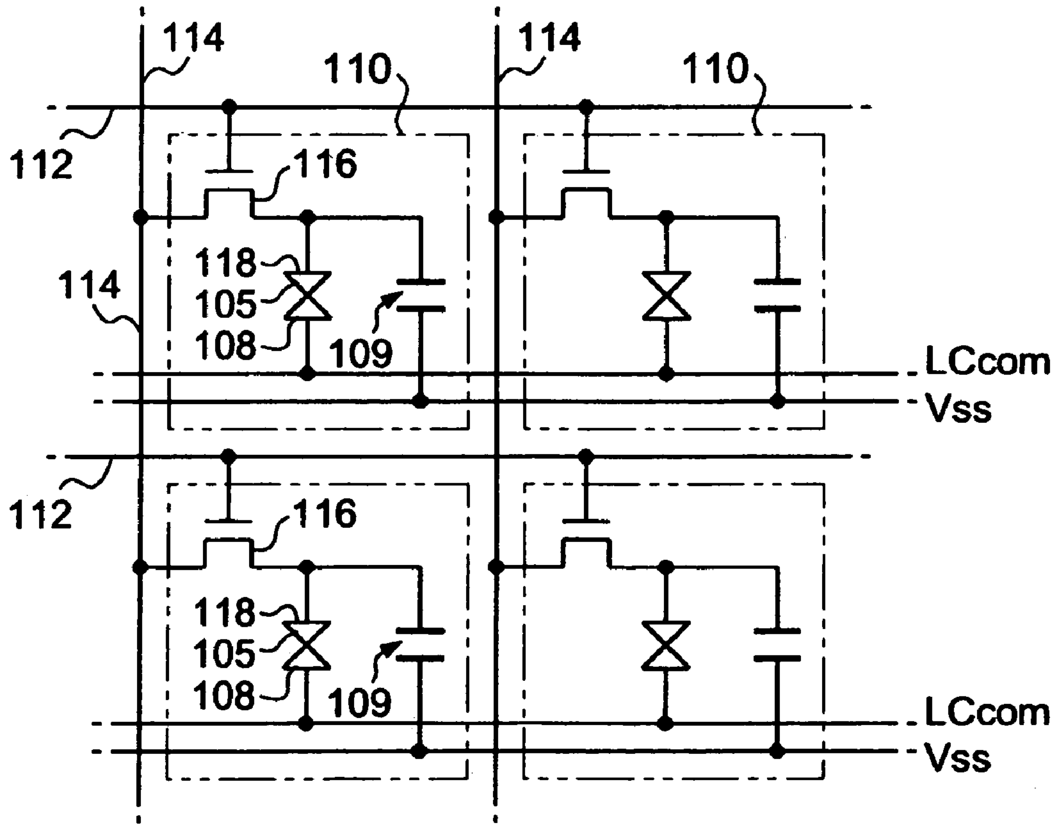
FIG. 4 is a view showing an electrical structure of the pixel.

Further, even though the electrical structure of the sub-pixel 110 is not limited, a structure in which liquid crystal elements are switched by using a thin film transistor (hereinafter, abbreviated to TFT) is shown in FIG. 4.

As shown in FIG. 4, a source of an n-channel TFT 116 is connected to the data line 114, a drain thereof is connected to a pixel electrode 118, and a gate thereof is connected to the scanning line 112. Further, a common electrode 108 is provided for the sub-pixels 110 in each dot so as to face the pixel electrode 118. The common electrode is maintained at a constant voltage LCcom. A liquid crystal layer 105 is interposed between the pixel electrodes 118 and the common electrode 108. Therefore, the liquid crystal element (liquid crystal capacity) constituted by the pixel electrode 118, the common electrode 108, and the liquid crystal layer 105 is provided for every sub-pixel.

Although not shown in the drawings, alignment films, upon which a rubbing process has been performed so that the longitudinal direction of the liquid crystal molecules is continuously twisted at 90 degree, are provided on opposing surfaces of both substrates. Further, on the other surfaces of the substrates, polarizers are provided along the alignment direction.

In the above structure, when a H level scanning signal is supplied to the selected scanning line 112, the TFT 116 is in a conductive state so that a voltage of the data signal which was supplied to the data line 114 is applied to the pixel electrode 118. Further, when the scanning signal becomes an L level after completing the selection of the scanning line 112, the TFT 116 enters a non-conductive state. Even though the TFT 116 enters a non-conductive state, the liquid crystal maintains the voltage of the data signal applied at the time of selection due to the capacitance thereof. Therefore, an effective value of voltage in accordance with the voltage of the data signal is applied to the liquid crystal element.

When the effective value of the voltage which is applied to the liquid crystal element is zero, the polarization of light passing between the pixel electrode 118 and the common electrode 108 is rotated by 90 degree along the twisted axis of the liquid crystal molecules. Further, when the effective value of the voltage increases, the liquid crystal molecules are inclined toward the electric field direction, which results in the disappearance of the rotation of the optical polarization.

For example, in a transmissive type liquid crystal device, when polarizers whose polarizing axes are orthogonal to each other along the alignment direction are arranged on an incident side and a rear side, as the effective value of the voltage becomes closer to zero, the transmittance of the light reaches the maximum level. In contrast, an amount of transmitted light decreases with increasing the effective value of the voltage, and the transmittance reaches the minimum level (normally white mode).

Although not shown in the drawings, since color filters corresponding to RGBC are provided in the sub-pixels 110, the sub-pixels 110 control the gray scale level of the corresponding color among RGBC color components in accordance with the effective value of the voltage applied to the liquid crystal element.

Further, in order to reduce the effect of charge leakage from the liquid crystal via the TFT 116, storage capacitors 109 are provided for every sub-pixel. An end of each of the storage capacitor 109 is connected to the pixel electrode 118 (a drain of TFT 116), and the other end is grounded to low potential side Vss of the power source, throughout the pixels.

Operation of the image display device according to an embodiment of the invention will now be described.

RGB image data from the image memory 10 is read out in synchronization with scanning in the order of vertically and horizontally scanned dots to be supplied to the YUV converter 20. In the YUV converter 20, for each dot, RGB image data is converted into YUV data to be supplied to the resolution converter 30. RGB image data is converted into YUV data as shown in FIG. 6.

Figure 5:
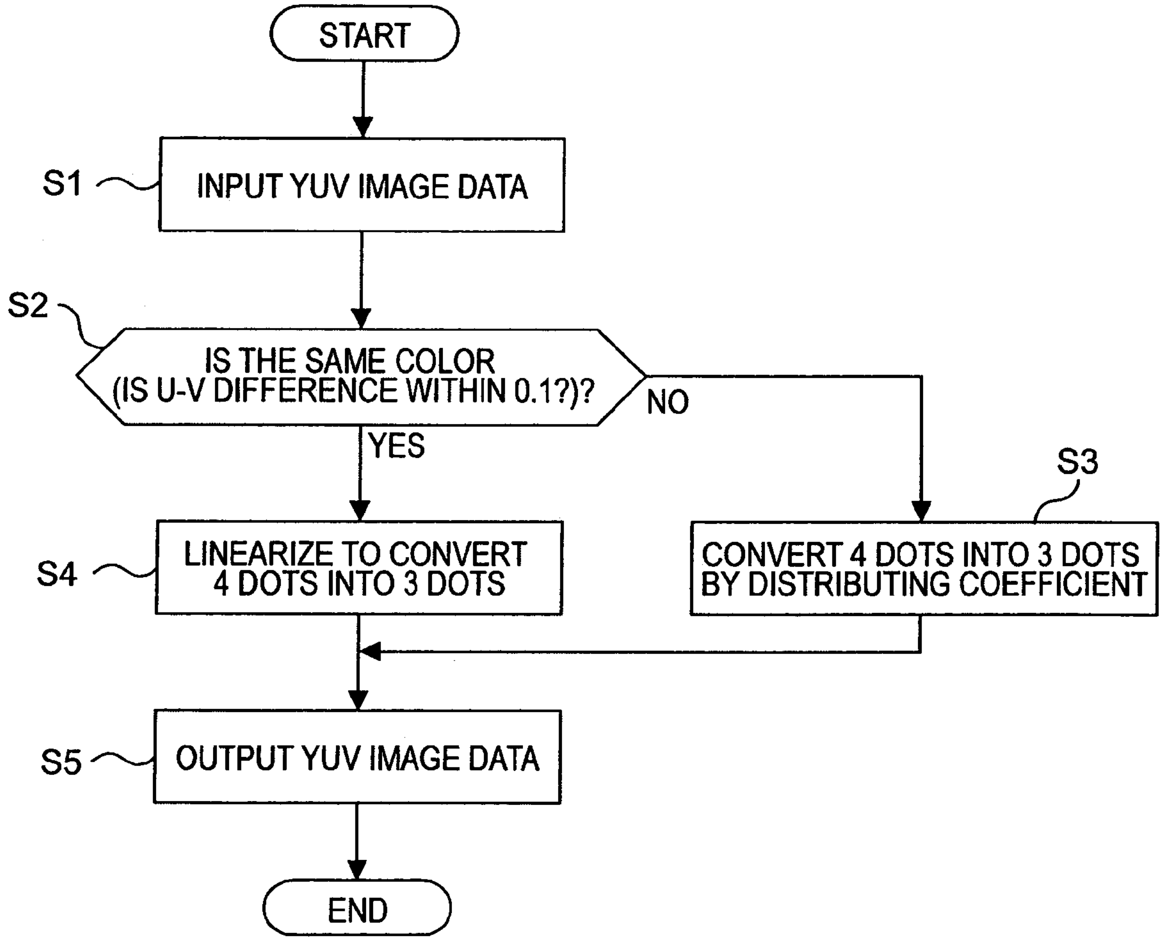
FIG. 5 is a flowchart illustrating an operation of image processing of the image display device.

Data processing in the resolution converter 30 will now be described with reference to FIG. 5. FIG. 5 is a flow-chart showing the procedure when image data of 4 dots disposed adjacent to each other in the horizontal direction is converted into image data of 3 dots.

First, in step S1, 4 dot data which are converted into YUV data are input, and then in step S2, the resolution converter 30 determines whether the 4 dots are achromatic color (gray). In this embodiment, for example, when the average of the Y-V values of the 4 dots is less than 0.1, the resolution converter determines that the 4 dots are of achromatic color (Yes), otherwise, when the average exceeds 0.1, the resolution converter determines that the 4 dots are not of achromatic color (No).

Figures 6, 7:
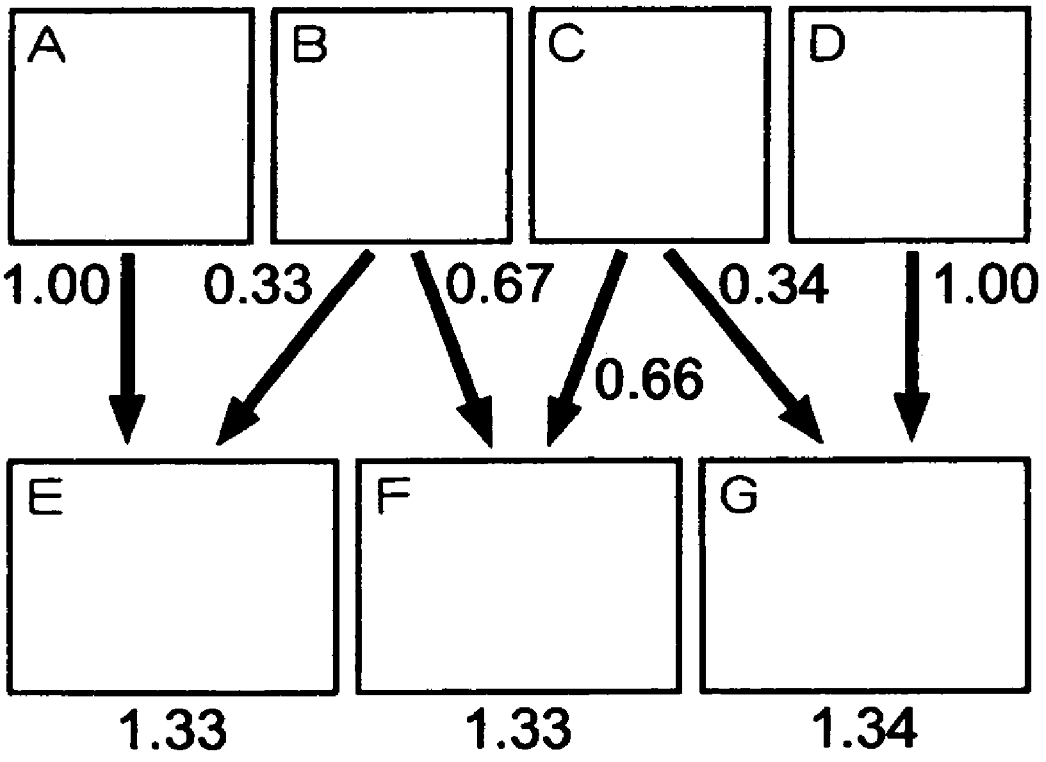
FIG. 6 is a view showing RGB→YUV conversion in the image processing.
FIG. 7 is a view illustrating resolution conversion in the image processing.

When it is determined that the 4 dots are of achromatic color on the basis of YUV data of input 4 dots, in step S3, the resolution converter 30 distributes coefficients in the YUV data of 4 dots to be YUV data of 3 dots, as shown in FIG. 7. Thereby, 4→3 dots conversion is performed. For example, a YUV value of dot E after conversion is a value that YUV values of a dot A and a dot B before conversion are allocated by a ratio of 3:1. Therefore, in step S3, the 4 dot data is converted into 3 dot data without losing color information of the 4 dots before conversion.

On the other hand, when it is determined that the 4 dots have the same color on the basis of the input YUV data of 4 dots, the resolution converter 30 performs constitution (linearization) and 3 dot conversion in step S4. Herein, the constitution refers to an operation in which among YUV data of 4 dots, the resolution converter 30 compares a Y value (luminance) with a threshold value $\alpha$, allocates '0' to a dot below the threshold value $\alpha$, and allocates '1' to a dot over the threshold value $\alpha$ to be compulsively linearized (which is divided into '1' corresponding to line portion and '0' corresponding to a blank portion). The linearization is performed in order to prevent loss of the contour information such as an edge of a line image portion, caused by conversion to 3 dots in step S3 when the 4 dots portion before conversion is a line image portion including characters.

Figures 8, 9:
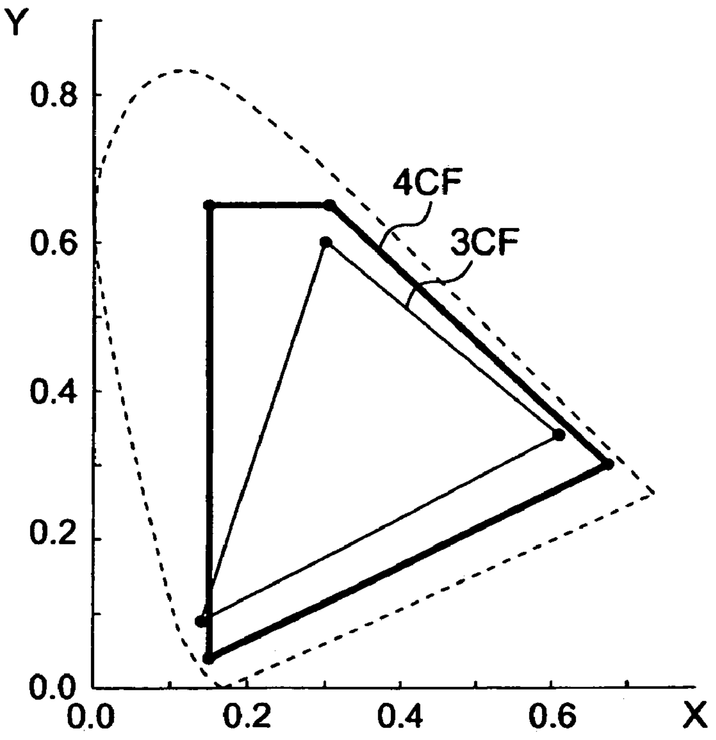
FIG. 8 is a view showing a content of line detection and conversion in the image processing.
FIG. 9 is a view showing enlargement of image reproduction region in the image display device.

Since there are sixteen cases of combinations of '0' and '1' which is a result of comparing Y value of 4 dots with the threshold value $\alpha$, the resolution converter 30 converts a 4 dot pattern into a 3 dot pattern for each of the sixteen cases, as shown in FIG. 8.

For example, when the result of comparing Y value of 4 dots with the threshold value $\alpha$ is '1110', the corresponding 4 dots shows that 3 dots of line portion are adjacent to each other on the right side, and one dot of the blank portion is on the left side. Therefore, in order to hold the contour information, the dots are converted into '110'. Further, when the result of comparing Y value of 4 dots with the threshold value $\alpha$ is '0010', '0100' or '0110', the corresponding 4 dots show that dots of line portion are positioned around the center (of 4 dots). Therefore, in order to hold the contour information, the dots are converted into '010'.

Next, the resolution converter 30 outputs a Y value of a dot which is converted into '0' as a maximum value, and outputs another Y value of a dot which is converted into '1' as a minimum value in order to obtain YUV data corresponding to 3 dot pattern after conversion. Simply, the YUB data may be formed such that '1' of the converted dot pattern denotes black and '0' denotes white.

Further, in step S4, even though color information of the 4 dots before conversion is lost, the contour information is held to be converted into 3 dot data.

Furthermore, at the time of 4→3 dot conversion, in order not to lose the contour information, there is a method of detecting an edge by applying a Laplacian filter to 5 dots that are closest to the 4 dots, in addition to the 4 dots.

Moreover, the resolution converter 30 outputs the YUV data which is converted into YUV data of 3 dots in step S5. The above resolution converter 30 converts the YUV data of 4 dots into the YUV data of the 3 dots to supply the color separating unit 40 in the steps S1 to S5. Further, the resolution converter 30 repeatedly performs the above steps whenever RGB image data of the 4 dots are supplied thereto.

The color separating unit 40 converts the resolution-converted YUV data of 3 dots into RGBC image data, the driving circuit 50 supplies a data signal of the RGBC image data to the data lines 114 to control the gray-scale level of RGBC sub-pixels 110 in the display unit 100, as mentioned before.

According to the above embodiment, since one dot of the display image is represented by 4 colors of RGBC, in the CIExy chromaticity diagram of FIG. 9, the displayable color range (4 CF) is enlarged so as to be larger than a range (3 CF) in which one dot is represented by three color of RGB.

Figure 3B:
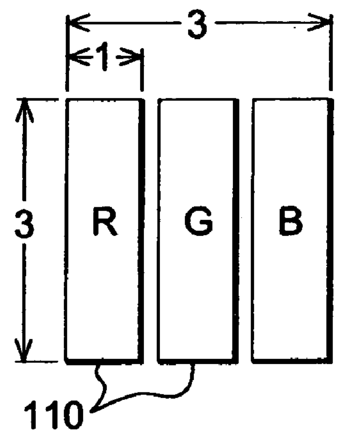

Further, according to this embodiment, the one dot configured by 4 RGBC sub-pixels 110 is a rectangular in which the ratio of the vertical length to horizontal length is 3:4, as shown in FIG. 3A. Therefore, by only modifying the arrangement of the color filters in the related art, it is possible to realize the one dot configured by 4 RGBC sub-pixels 110. In the related art, even though a square one dot is configured by three RGB sub-pixels 11 as shown in FIG. 3B, the present embodiment is performed only by changing the arrangement of color filters of RGBRGB . . . RGB into RGBCRGBC . . . RGBC. Therefore, it is not needed to change a design of wiring lines on the element substrate or correct manufacturing processes other than color filter forming process. So, it is possible to suppress design change or cost increase due to the design change.

In this embodiment, since one dot configured by 4 RGBC sub-pixels 110 is of a rectangular shape whose ratio of vertical width to horizontal width is 3:4, the resolution in the horizontal direction is reduced by ¾. However, at the time of conversion, in order not to lose color information of the original pixel in the step S3, or not to lose region information of the original pixel in the step S4, the conversion is performed by selecting any one of the color information and the region information. Therefore, after conversion the resolution, it is possible to appropriately reflect the characteristics of the original image.

Figure 10A:
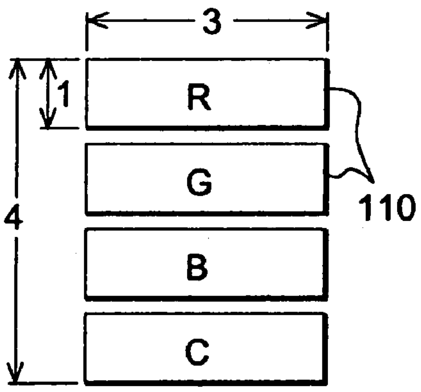
FIG. 10 is a view showing another example of dot shape in the image display device.
Figure 10B:
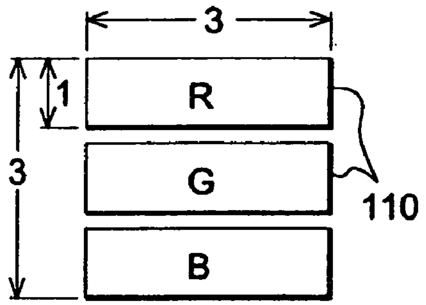

In the above embodiment, even though the horizontal: vertical of one dot is approximately 4:3, in the case of using the display unit arranged as shown in FIG. 10B, similarly, the ratio of the horizontal to vertical of one dot may be 4:3 as shown in FIG. 10A. In this structure, the vertical resolution with respect to the original image may be ¾.

Further, in the above embodiment, even though the ratio of horizontal width to vertical width of one dot is 3:4, but it is not limited thereto, the ratio may be 3:5 or 3:6 (5:3 or 6:3) or the horizontal component of the ratio (the vertical component of the ratio) or may be an integer larger than 3. That is, one dot may be displayed by M (which is larger than 3) colors of sub-pixels, and the resolution of the original image in the horizontal direction or the vertical direction may be 3/M.

The YUV converter 20, the resolution converter 30, and the color separating unit 40 may not be formed by a dedicated hardware, but performed by using software which executes a program on a personal computer.

The liquid crystal device is not limited to the transmissive type, the liquid crystal device may be a reflective type or a transflective type which is between the transmissive and the reflective types in terms of characteristics. Further, in addition to TFT 116, serial connection of a thin film diode and a liquid crystal element may be electrically interposed between the scanning line 112 and the data line or the device may be a passive matrix type which does not use the above switching element.

Further, as a display unit, other than the liquid crystal device, an organic EL element, an inorganic EL element, a field emission (FE) element, LED, an electro chromic element, or the like may be used.

Figure 11:
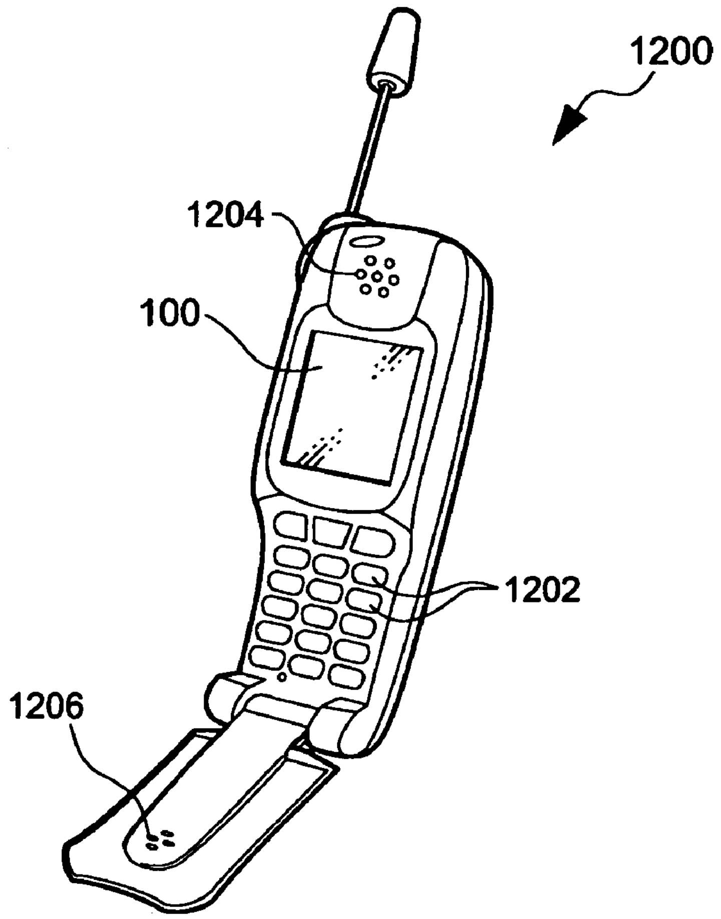
FIG. 11 is a view showing a structure of a portable telephone in which the image display device is applied.

Next, an electronic apparatus having the image display device according to the above embodiment will be explained. FIG. 11 is a perspective view showing the structure of a cellular phone 1200 using the image display device 1 according to the embodiment.

As shown in FIG. 11, the cellular phone 1200 includes a plurality of manipulating buttons 1202, an ear piece 1204, a mouthpiece 1206, and the display unit 100 mentioned above. Further, in the image display device 1, elements other than the display unit 100 are embedded in the cellular phone, these elements are not shown.

As electronic apparatuses in which the image display device 1 is applied, there are a digital still camera, a laptop computer, a liquid crystal TV, a view finder type (or monitor direct view type) video recorder, a car navigation device, a pager, an organizer, a calculator, a word processor, a workstation, a video phone, a POS terminal, an apparatus with a touch panel, other than the cellular phone. Therefore, it is further possible to apply the above-mentioned image display device 1 in the various electronic apparatuses.

What is claimed is:

1. An image display device, comprising:

a plurality of dots each of which comprises M sub-pixels configured to display different colors and being disposed adjacent to each other in a first direction, wherein M is an integer greater than 3, and a ratio of a length of each dot in the first direction to a length of said dot in a second direction orthogonal to the first direction is M:3;

a resolution converter for reducing a resolution in the first direction of input image data, which defines an image to be displayed by every dot, by 3/M;

a color separating unit for separating color components of the image data converted by the resolution converter into color components corresponding to the M sub-pixels for every dot; and a driving circuit for driving the sub-pixels to display the image at a resolution defined by the image data outputted by the color separating unit.

2. The image display device according to claim 1, wherein the input image data comprises M dot image data; and the resolution converter is configured for determining whether the M dot image data is of achromatic color, and then converting the M dot image data to 3 dot image data in accordance with a predetermined rule on the basis of the determination.

3. The image display device according to claim 2, wherein the resolution converter is further configured for, when it is determined that the M dot image data is of achromatic color, comparing luminance information of the M dot image data with a predetermined threshold value, and then converting the M dot image data into the 3 dot image data on the basis of the comparison.

4. The image display device according to claim 2, wherein the resolution converter is further configured for, when it is determined that the M dot image data is not of achromatic color, distributing a predetermined coefficient in the M dot image data to change the M dot image data into the 3 dot image data.

5. The image display device according to claim 1, wherein M is 4.

6. An electronic apparatus, comprising:

the image display device according to claim 1.

7. A method of driving an image display device in which each of a plurality of dots comprises M sub-pixels configured to display different colors and being disposed adjacent to each other in a first direction, wherein M is an integer greater than 3, and a ratio of a length of each dot in the first direction to a length of said dot in a second direction orthogonal to the first direction is M:3;

the method comprising:

converting input image data, which defines an image to be displayed by every dot, wherein said converting comprises reducing, by a resolution converter, a resolution in the first direction of the input image data by 3/M;

separating, by a color separating unit, color components of the image data converted by the resolution converter into color components corresponding to the M sub-pixels for every dot; and driving, by a driving unit, the sub-pixels to display the image at a resolution defined by the image data outputted by the color separating unit.

8. The method according to claim 6, wherein the input image data comprises M dot image data; and the converting further comprises determining whether the M dot image data is of achromatic color, and then converting the M dot image data to 3 dot image data in accordance with a predetermined rule on the basis of the determination.

9. The method according to claim 8, wherein the converting further comprises, when it is determined that the M dot image data is of achromatic color, comparing luminance information of the M dot image data with a predetermined threshold value, and then converting the M dot image data into the 3 dot image data on the basis of the comparison.

10. The method according to claim 8, wherein the converting further comprises, when it is determined that the M dot image data is not of achromatic color, distributing a predetermined coefficient in the M dot image data to change the M dot image data into the 3 dot image data.

11. The method according to claim 8, wherein M is 4.

12. An image display device in which one dot is displayed using M (M is an integer larger than 3) sub-pixels having different colors and being disposed adjacent to each other in a vertical direction or horizontal direction, a ratio of a length of a sub-pixel of the one dot in a disposition direction to a length in a direction orthogonal to the disposition direction being M:3, comprising:

a resolution converter that converts the resolution in the disposition direction of the image data which defines an image to be displayed for every dot to 3/M;

a color separating unit that separates color components of the image data converted by the resolution converter into color components corresponding to the M sub-pixels for every dot; and a driving circuit that drives the sub-pixels so as to have a resolution defined by the image data separated by the color separating unit;

wherein the resolution converter determines whether the M dot image data is of achromatic, and then converts 3 dot image data with a predetermined rule on the basis of the determination.

13. The image display device according to claim 12, wherein when it is determined that the M dots are of achromatic on the basis of the M dot image data, the resolution converter compares luminance information of the M dot image data with a predetermined threshold value, and then converts the M dot image data into 3 dot image data on the basis of the comparison.

14. The image display device according to claim 12, wherein when it is determined that the M dot image data is not of achromatic, the resolution converter distributes a predetermined coefficient in the M dot image data to change the M dot image data into 3 dot image data.

15. The image display device according to claim 12, wherein M is 4.

* * * * *